United States Patent
Choi

(10) Patent No.: US 8,240,686 B2
(45) Date of Patent: Aug. 14, 2012

(54) SELF STEERING APPARATUS

(76) Inventor: Jin Man Choi, Chungcheongbuk-do (KR)

( * ) Notice: Subject to any disclaimer, the term of this patent is extended or adjusted under 35 U.S.C. 154(b) by 170 days.

(21) Appl. No.: 12/742,164

(22) PCT Filed: Nov. 10, 2008

(86) PCT No.: PCT/KR2008/006600
§ 371 (c)(1),
(2), (4) Date: May 10, 2010

(87) PCT Pub. No.: WO2009/061158
PCT Pub. Date: May 14, 2009

(65) Prior Publication Data
US 2010/0270765 A1    Oct. 28, 2010

(30) Foreign Application Priority Data
Nov. 10, 2007   (KR) .................. 10-2007-0114599

(51) Int. Cl.
*B62D 7/16* (2006.01)
*B62D 1/02* (2006.01)
(52) U.S. Cl. ............... 280/93.51; 280/266; 280/87.042
(58) Field of Classification Search .............. 280/266, 280/87.043, 87.042, 93.51; *B62D 7/16, 1/02*
See application file for complete search history.

(56) References Cited

U.S. PATENT DOCUMENTS

| | | | | |
|---|---|---|---|---|
| 4,132,435 A | * | 1/1979 | Wilson | 280/266 |
| 4,740,000 A | * | 4/1988 | Moessner | 280/7.12 |
| 6,352,274 B1 | * | 3/2002 | Redman | 280/248 |
| 6,581,947 B2 | * | 6/2003 | Andrews et al. | 280/266 |
| 2004/0036243 A1 | | 2/2004 | Chang | |
| 2006/0049597 A1 | * | 3/2006 | Chan et al. | 280/93.504 |
| 2008/0203696 A1 | * | 8/2008 | Akagi | 280/238 |

FOREIGN PATENT DOCUMENTS

| | | |
|---|---|---|
| KR | 1994-0014056 A | 7/1994 |
| KR | 10-2006-0101881 A | 9/2006 |
| WO | WO 8702951 A1 * | 5/1987 |

OTHER PUBLICATIONS

International Preliminary Report on Patentability issued in International Application No. PCT/KR2008/006600.

* cited by examiner

*Primary Examiner* — Paul N Dickson
*Assistant Examiner* — Keith Frisby
(74) *Attorney, Agent, or Firm* — Stein McEwen, LLP

(57) ABSTRACT

Disclosed herein is a steering apparatus. According to a self-steering apparatus of the present invention, an angle of wheels becomes tilted automatically depending on a slope of a frame in applications for forward two-wheeled vehicle or backward two-wheeled steering apparatus of bicycles, motorcycles, vehicles, and so forth. At the same time, a steering angle is also matched to the tilted direction.

4 Claims, 5 Drawing Sheets

[Fig. 1]
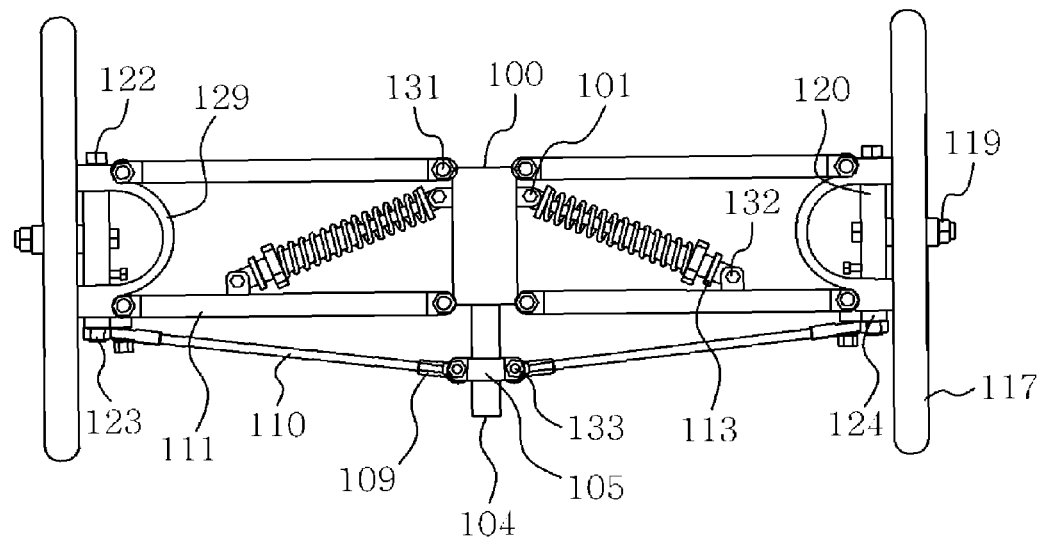
[Fig. 2]
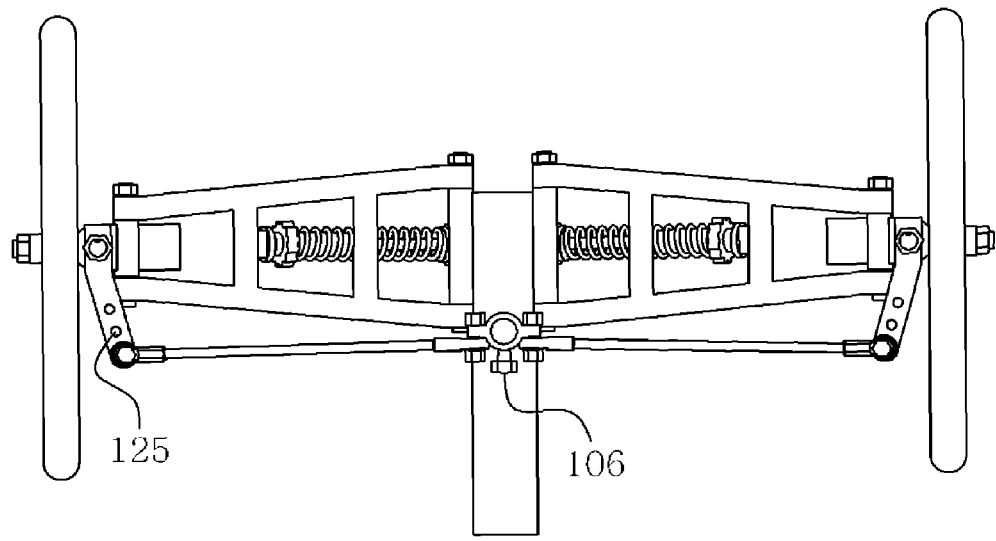

[Fig. 3]
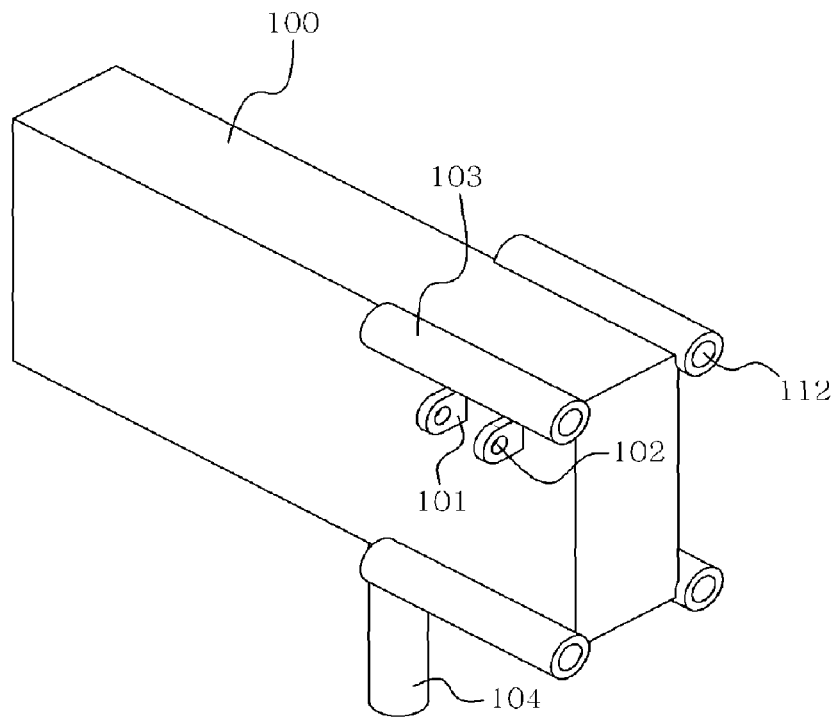
[Fig. 4]
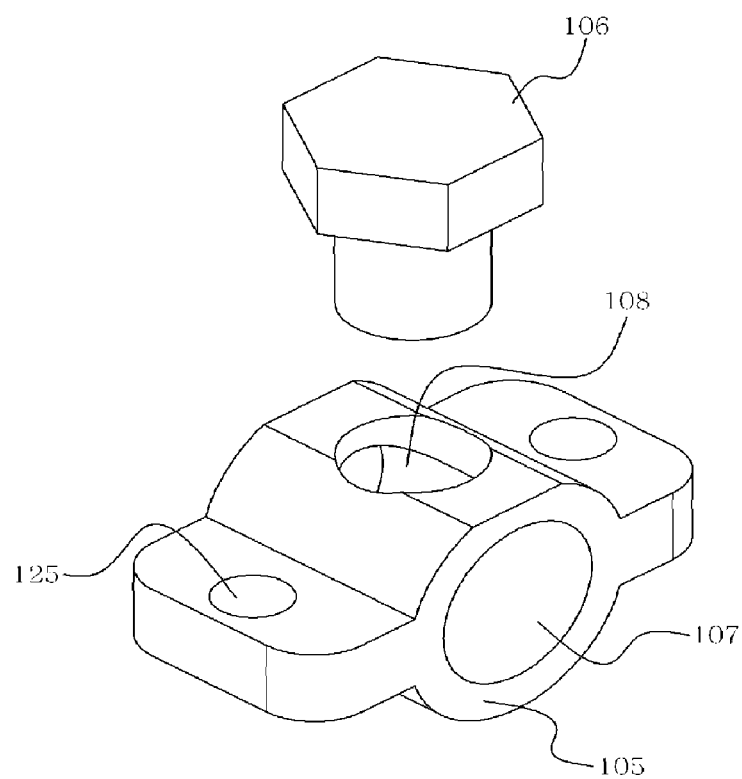

[Fig. 5]
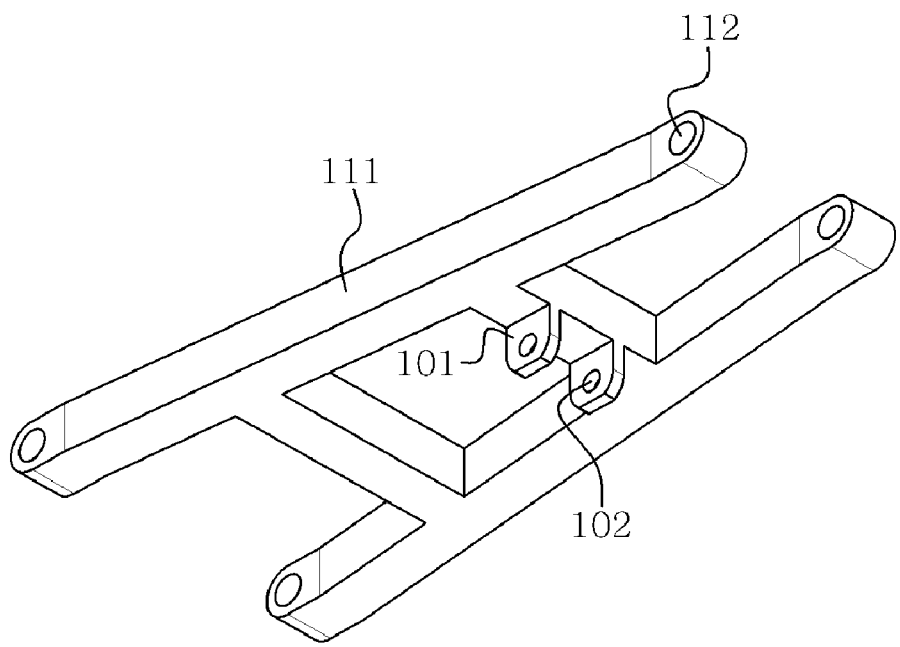
[Fig. 6]
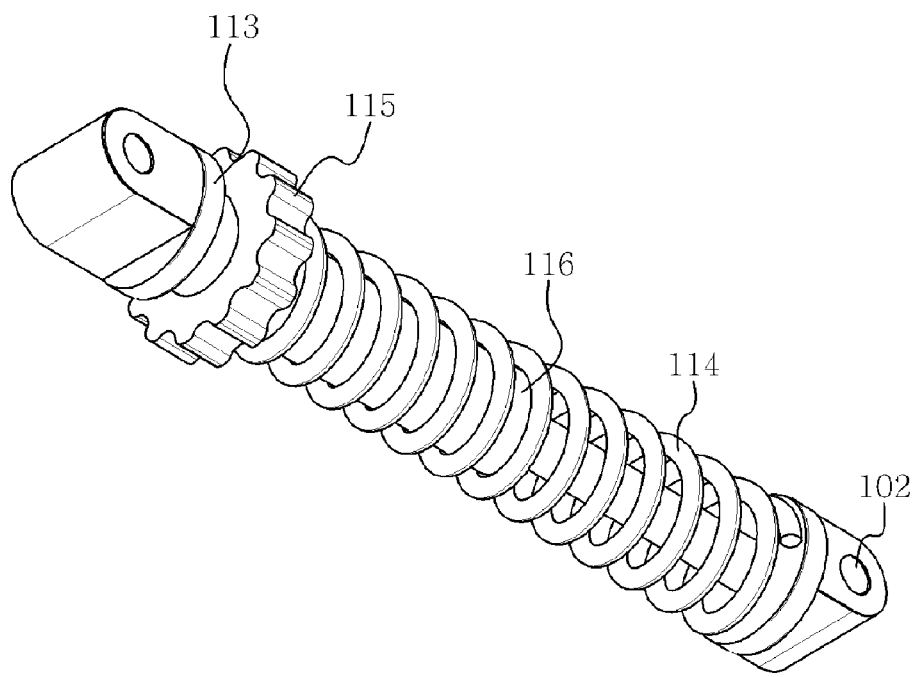

[Fig. 7]
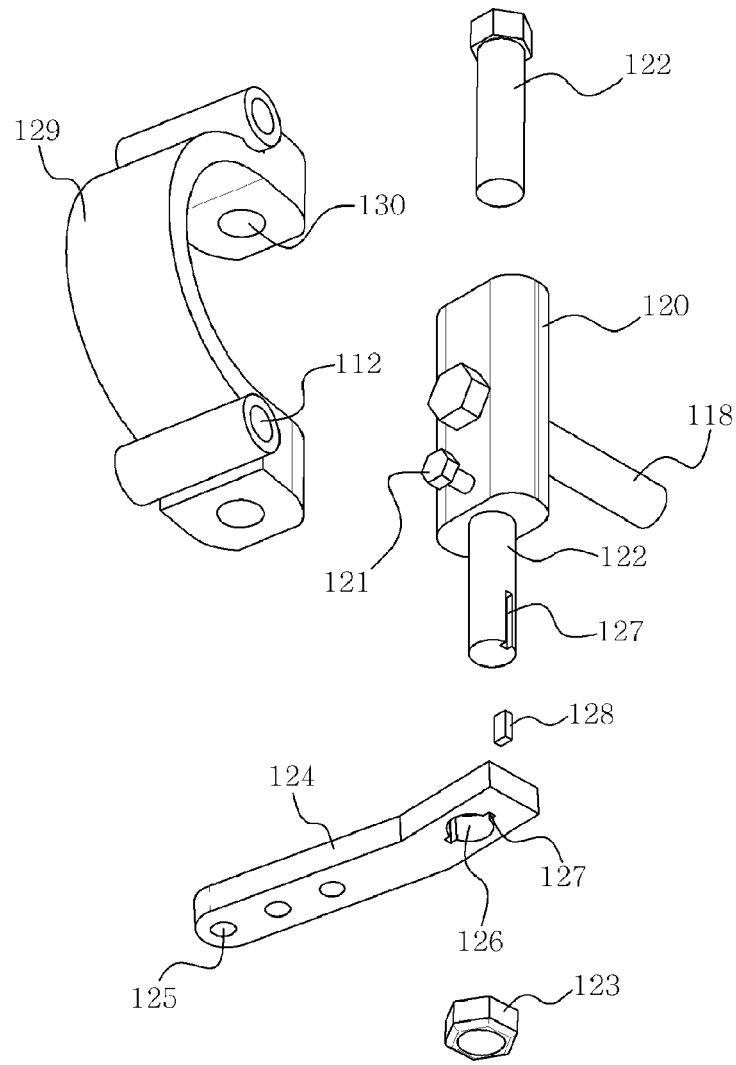
[Fig. 8]
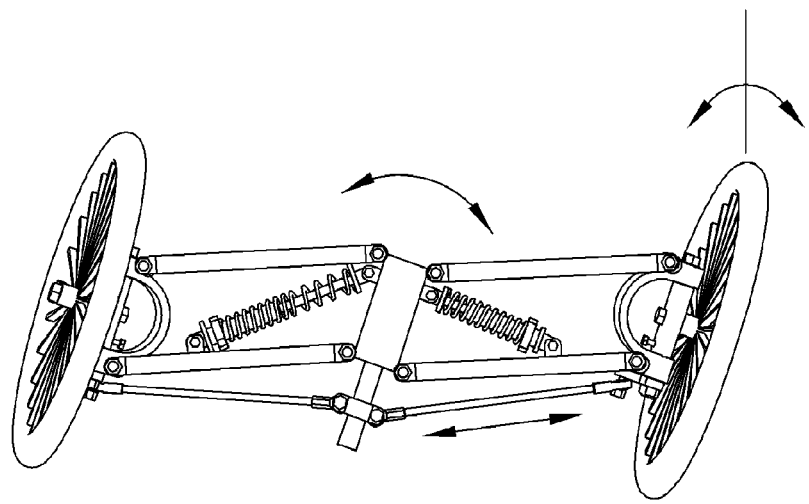

[Fig. 9]
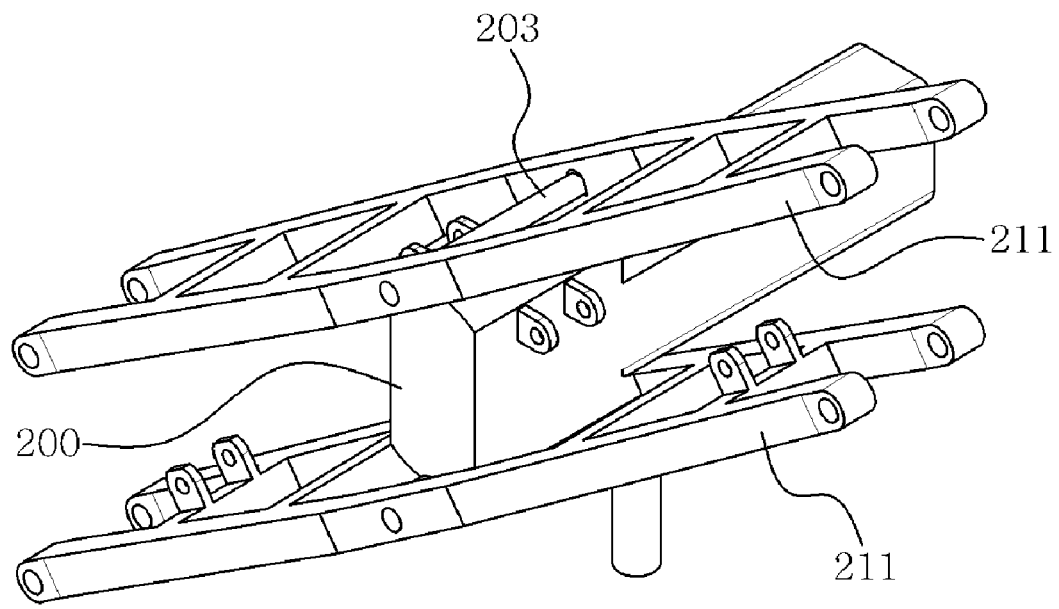

SELF STEERING APPARATUS

CROSS-REFERENCE TO RELATED APPLICATIONS

This is a National Phase Application filed under 35 USC 371 of International Application No. PCT/KR2008/006600, filed on Nov. 10, 2008, an application claiming foreign priority benefits under 35 USC 119 of Korean Application No. 10-2007-0114599, filed on Nov. 10, 2007, the content of each of which is hereby incorporated by reference in its entirety.

BACKGROUND OF THE INVENTION

1. Field of the Invention

The present invention relates to a steering apparatus. More particularly, the present invention relates to a self-steering apparatus is capable of controlling an angle of wheels being tilted automatically depending on a slope of a frame in applications for forward two-wheeled vehicle or backward two-wheeled steering apparatus of bicycles, motorcycles, vehicles, and so forth. At the same time, a steering angle is also matched to the tilted direction.

2. Description of the Related Art

Numerous efforts have been made to develop self-steering apparatus since a conventional steering apparatus only has capacity to converse directions by hand such as both hands and/or feet.

Accordingly, this steering apparatus is disadvantageous in that both hands and/or feet are not free during steering operation.

SUMMARY OF THE INVENTION

The present invention has been made in an effort to solve the above problems, and it is an object of the present invention to provide a self-steering apparatus capable of making an angle of a wheel tilted automatically depending on a slope of a frame as well as a direction of the wheel matching toward a tilted direction of the frame without a steering handle.

Embodiments of the present invention provide a self-steering apparatus comprising: a frame; a steering bracket fixedly mounted to a steering bar of the frame; two couples of axles hingedly fastened to one axle jointing hole of the frame respectively; a couple of balance-maintenance devices hingedly fastened to balance-maintenance device fixing holes of the frame and axle respectively; a couple of axle connecting members hingedly fastened to the other axle jointing hole of the frame; a couple of knuckles and two couple of kingpins hingedly fastened to the axle connecting member by a couple of up-and-down kingpins respectively; a couple of knuckle arms fixedly mounted to a couple of lower kingpins; and a couple of wheels rotatably fastened to the couple of knuckles. In this regard, a rod steers the knuckle arm depending on a slope of the frame, and the frame is balanced by the balance maintenance device, a direction is determined depending on a slope of the frame.

In some embodiments of the present invention, one of upper kingpins and the lower kingpin are equipped in one entity, and the other of the upper kingpins and the lower kingpin are equipped in one entity.

In other embodiments of the present invention, the knuckle and a knuckle arm are equipped in one entity.

In further embodiments of the present invention, a couple of up-and-down axle brackets are only connected to the frame, a couple of the upper axles are equipped in one entity, and a couple of the lower axles are equipped in one entity.

In other embodiments of the present invention, the self-steering apparatus is applied to various vehicles, motorcycles, bicycles, cycles equipped with a power system.

According to the self-steering apparatus of the present invention, both wheels become tilted at the same slope as the frame without the steering handle. At the same time, a rod connected to a steering bracket fastened to a steering bar which is extended under the frame pulls a knuckle arm placed at a tilted position. An opposite side of the tilted position is pushed. As a result, a vehicle is rotated in a direction where the frame is tilted.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a front view showing a self-steering apparatus in accordance with a first embodiment of the present invention;

FIG. 2 is a back elevation view showing a self-steering apparatus in accordance with a first embodiment of the present invention;

FIG. 3 is a perspective view a frame in accordance with a first embodiment of the present invention;

FIG. 4 is a perspective view a steering bracket in accordance with a first embodiment of the present invention;

FIG. 5 is a perspective view an axle in accordance with a first embodiment of the present invention;

FIG. 6 is a perspective view a balance-maintenance device in accordance with a first embodiment of the present invention;

FIG. 7 is a decomposition diagram showing a knuckle arm in accordance with a first embodiment of the present invention;

FIG. 8 is a perspective view showing steering operation in accordance with a first embodiment of the present invention; and FIG. 9 is a perspective view of a frame and an axle in accordance with a second embodiment of the present invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As used herein, the terms about, substantially, etc. are intended to allow some leeway in mathematical exactness to account for tolerances that are acceptable in the trade and to prevent any unconscientious violator from unduly taking advantage of the disclosure in which exact or absolute numerical values are given so as to help understand the invention.

FIG. 1 is a front view showing a self-steering apparatus in accordance with a first embodiment of the present invention. FIG. 2 is a back elevation view showing a self-steering apparatus in accordance with a first embodiment of the present invention. FIG. 3 is a perspective view a frame in accordance with a first embodiment of the present invention. FIG. 4 is a perspective view a steering bracket in accordance with a first embodiment of the present invention. FIG. 5 is a perspective view an axle in accordance with a first embodiment of the present invention. FIG. 6 is a perspective view a balance-maintenance device in accordance with a first embodiment of the present invention. FIG. 7 is a decomposition diagram showing a knuckle arm in accordance with a first embodiment of the present invention. FIG. 8 is a perspective view showing steering operation in accordance with a first embodiment of the present invention. FIG. 9 is a perspective view of a frame and an axle in accordance with a second embodiment of the present invention.

The self-steering apparatus in accordance with a first embodiment of the present invention, as shown in FIGS. 1 and 2, includes a frame 100, a steering bracket 105, two couples of axles 111, a couple of balance maintenance devices 113, a couple of axle connecting members 129, a couple of knuckles 120, two couples of kingpins 122, a couple of knuckle arms 124, a couple of rods 110, and a couple wheels 117.

With reference to FIG. 3, the frame 100 is rectangle-shaped. At front edges of the frame 100, four axle brackets 103 having axle fastening holes 112 are mounted in parallel to the front edges using welding. Each of four axle brackets 103 is hingedly fastened to one end of ladder-shaped axle 111 by an axle fastening bolt and nut 131. A balance maintenance device bracket 101 having a balance maintenance device fastening hole 102 is mounted at an upper portion of both front sides of the frame 100. A steering bar 104 is extended to be attached at a lower portion of both front sides of the frame 100 by welding. The rear structure of the frame 100 is omitted and not illustrated.

As shown in FIG. 4, the steering bracket fastening hole 107 is punched at a center portion of the steering bracket 105 up and down in order to insert the steering bar 104. The steering bracket fixing bolt hole 108 is punched at a center portion of both sides of the steering bracket 105 by the fixing bolt 106 so as to fixedly dispose the steering bracket 105 at a proper position of the steering bar 104. A couple of rod end bearing fastening holes 125 are punched to fasten the rod end bearing 109, respectively.

Preferably, two couples of axles 111 are ladder-shaped as shown in FIG. 5. The axle fastening holes 112 is penetrated into both ends of the axles 111 in a width direction. At a lower center portion of both sides of the axles 111, the balance maintenance device bracket 101 having the balance maintenance device fastening hole 102 is attached using welding like the balance maintenance device bracket 101 of the frame 100. The axles 111 share the axle fastening hole 112 mounted on one end thereof and the axle fastening frame 112 of the frame 100 to be hingedly fastened by the axle fastening bolt and nut 131.

A couple of the balance maintenance devices 113 include a damper 116 performing a damping function and preferably uses a shove capable of controlling tension of the balance maintenance device elastic member 114 by the tension controlling nut 115 and having the balance maintenance device fastening hole 102 at both ends thereof. One end of the balance maintenance device 113 is hingedly fastened to the balance maintenance device fastening hole 102 of the frame 100, and the other end thereof is hingedly fastened to the balance maintenance device fastening hole 102 of the axle 111 using the hingedly fastened to the balance maintenance device bolt and nut 132, respectively.

With reference to FIG. 7, a couple of axle brackets 103 including the axle fastening hole 112 located up and down in a horizontal direction is connected to a couple of axle connecting members 129 using a half moon-shaped member. The kingpin inserting hole 130 is penetrated into the half moon-shaped member. The axle fastening hole 112 mounted on the other end of the up-and-down axle 11 is shared in the axle fastening hole 112 of the axle connecting member 129 to be hingedly fastened to the axle fastening hole 112 using the axle fastening bolt and nut 131.

As shown in FIG. 7, the kingpin inserting hole 130 being pillar-shaped is punched up and down of a couple of knuckles 120. The wheel shaft 118 is fixedly mounted toward outside direction at a center portion of the knuckle 120. The couple of up-and-down kingpins 122 are hingedly fastened to the knuckle 120 at both insides of the axle connecting member 129. At lower lateral surface of the knuckle 120, the knuckle 120 is hingedly fastened to the lower kingpin 122 by the kingpin fixing bolt 121.

With reference to FIG. 7 again, the couple of kingpin 122 have different configuration. A conventional bolt having a thread is employed at a lower portion of the upper kingpin 122. Unlike this, a key groove 127 and a thread are formed at a lower portion of the lower kingpin 122. The kingpin 122 is rotatably fastened at a center portion of the couple of knuckles 120.

It is preferable that a couple of knuckle arms 124 are made of a material curved at a predetermined angle in order that a rotation angle of both wheels is steered differently as shown in FIG. 7. The kingpin inserting hole 130 having key groove 127 at both sides thereof is punched at one end of the knuckle arm 124 to be fixed by the knuckle arm 124 and the key 128. Several rod end bearing fixing hole 125 are punched along a center line of the knuckle arm 124, so that the rod end bearing 109 is fastened at a proper position to have different steering angle despite of constant slope of the frame 100.

The couple of rods 110, as shown in FIGS. 1 and 2, form an opposite direction screw at both ends of the axle connecting member 129. Preferably, the rods 110 are constructed by fastening the couple of rod end bearings 109 having an opposite direction screw. One end of the rod end bearing 109 is fastened to the rod end bearing fastening hole 125 of the knuckle arm 124 by the rod end fastening bolt and nut 133. The other end of the rod end bearing 109 is fastened to the rod end bearing fastening hole 125 at both sides of the steering bracket 105 by the rod end fastening bolt and nut 133.

As shown in FIGS. 1 and 2, a couple of wheels 117 are rotatably fastened to a couple of wheel shafts respectively mounted on a couple of knuckles 120. The couple of wheels 117 are fixed by the wheel fastening nut 119, respectively. In the event that the frame 100 becomes tilted by movements of passengers or other powers, the up-and-down axles 111 and the axle connecting member is constructed in a rectangular link. Resultantly, the wheels becomes tilted in the same slope as the frame 100 and at the same time, the rod 110 connected to the steering bracket 105 fastened to the steering bar 104 which is extended under the frame 100 pulls the knuckle arm 124 placed at a tilted position. An opposite side of the tilted position is pushed. As a result, a vehicle is rotated in a direction where the frame 100 is tilted. In backward two-wheeled steering apparatus, the same effect can be obtained by turning angle of the frame 100 as much as 180.degree.

In accordance with a second embodiment of the present invention, as shown in FIG. 9, a couple of axle brackets 203 are only disposed up and down of the frame 200, and a couple of up-and-down axles 211 are equipped in one entity at both side of the axle bracket, respectively.

Although the present invention has been described herein with reference to the foregoing embodiments and the accompanying drawings, the scope of the present invention is defined by the claims that follow. Accordingly, those skilled in the art will appreciate that various substitutions, modifications and changes are possible, without departing from the spirit of the present invention as disclosed in the accompanying claims. It is to be understood that such substitutions, modifications and changes are within the scope of the present invention.

According to the self-steering apparatus of the present invention, an angle of wheels becomes tilted automatically depending on a slope of a frame in applications for forward two-wheeled vehicle or backward two-wheeled steering apparatus of bicycles, motorcycles, vehicles, and so forth. At the same time, a steering angle is also matched to the tilted direction.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A self-steering apparatus comprising:
a frame;
a steering bracket fixedly mounted to a steering bar of the frame;
two couples of axles, each axle being hingedly fastened to a corresponding axle fastening hole of the frame;
a couple of balance-maintenance devices hingedly fastened to balance-maintenance device fixing holes of the frame and the axles respectively;
a couple of axle connecting members, each axle connecting member being hingedly fastened to a corresponding couple of the two couples of axles via axle fastening holes of the axle connecting member;
a couple of knuckles, each knuckle being hingedly fastened to one of the couple of axle connecting members by a couple of up-and-down kingpins;
a couple of knuckle arms fixedly mounted to a couple of lower kingpins; and
a couple of wheels rotatably fastened to the couple of knuckles,
wherein a couple of rods steer the knuckle arms depending on a slope of the frame, the frame is balanced by the balance maintenance device, and a direction of the couple of wheels is determined depending on a slope of the frame.

2. The self-steering apparatus according to claim 1, wherein one of the upper kingpins and one of the lower kingpins are equipped in one entity, and the other of the upper kingpins and the other of the lower kingpins are equipped in one entity.

3. The self-steering apparatus according to claim 1, wherein the knuckle and a knuckle arm are equipped in one entity.

4. The self-steering apparatus according to claim 1, wherein a couple of upper axles are equipped in one entity, and wherein a couple of lower axles are equipped in one entity.

* * * * *